(12) United States Patent
Peel

(10) Patent No.: US 6,824,166 B2
(45) Date of Patent: Nov. 30, 2004

(54) STEERING COLUMN CLAMPING MECHANISM

(75) Inventor: Richard James Peel, Coventry (GB)

(73) Assignee: NSK Steering Systems Europe Limited, Berkshire (GB)

( * ) Notice: Subject to any disclaimer, the term of this patent is extended or adjusted under 35 U.S.C. 154(b) by 0 days.

(21) Appl. No.: 10/187,300

(22) Filed: Jul. 2, 2002

(65) Prior Publication Data

US 2004/0004347 A1 Jan. 8, 2004

(30) Foreign Application Priority Data

Jul. 13, 2001 (GB) .............................. 0117112

(51) Int. Cl.$^7$ ................................................ B62D 1/18
(52) U.S. Cl. ................................................... 280/775
(58) Field of Search .......................... 280/775; 74/492, 74/493

(56) References Cited

U.S. PATENT DOCUMENTS

| | | | | |
|---|---|---|---|---|
| 2,374,403 A | * | 4/1945 | Yarnell | 411/265 |
| 4,050,836 A | * | 9/1977 | Anders | 408/20 |
| 4,126,067 A | * | 11/1978 | Giannetti | 82/159 |
| 4,561,323 A | * | 12/1985 | Stromberg | 74/493 |
| 5,117,707 A | * | 6/1992 | Kinoshita et al. | 74/493 |
| 5,301,567 A | * | 4/1994 | Snell et al. | 74/493 |
| 5,363,716 A | * | 11/1994 | Budzik, Jr. et al. | 74/493 |
| 5,743,151 A | * | 4/1998 | Khalifa et al. | 74/493 |
| 6,082,941 A | * | 7/2000 | Dupont et al. | 411/7 |
| 6,092,957 A | * | 7/2000 | Fevre et al. | 403/373 |

FOREIGN PATENT DOCUMENTS

| | | |
|---|---|---|
| DE | 36 19 125 C1 | 10/1987 |
| DE | 698 10 553 T2 | 10/2003 |
| EP | 544 113 A2 | 6/1993 |
| GB | 653609 | 5/1951 |
| GB | 2 092 966 A | 8/1982 |

OTHER PUBLICATIONS

Niemann, G.: Maschinenelemente (Machine Elements), vol. I, 2. Edition, Springer Verlag, Berlin Heidelberg New York 1981, ISBN: 3–540–06809–0, pp. 240 and 241.

* cited by examiner

Primary Examiner—Michael J. Carone
Assistant Examiner—Bret Hayes
(74) Attorney, Agent, or Firm—Miles & Stockbridge P.C.

(57) ABSTRACT

A clamp bolt assembly for a clamping mechanism, particularly for an adjustable steering column for a vehicle, includes a substantially cylindrical bolt or rod with one end threaded to receive a lock nut and with its other end having a reduced-diameter portion to form a shoulder against which a pack of disc springs can be held in place by a nut preened onto the end of the rod. When the rod is placed under tension between its ends, the disc springs provide a substantially constant secondary load function to compensate for any loss of tensile load in the rod. This is particularly applicable to an adjustable steering column clamping mechanism where the rod forms the bolt of a clamp bolt assembly and the primary load is applied at one end against the set of disc springs. Accordingly, during normal vehicle life of the steering column, compressive creep, surface-to-surface wear, etc. is compensated for by the substantially constant force provided by the clamp bolt assembly.

19 Claims, 3 Drawing Sheets

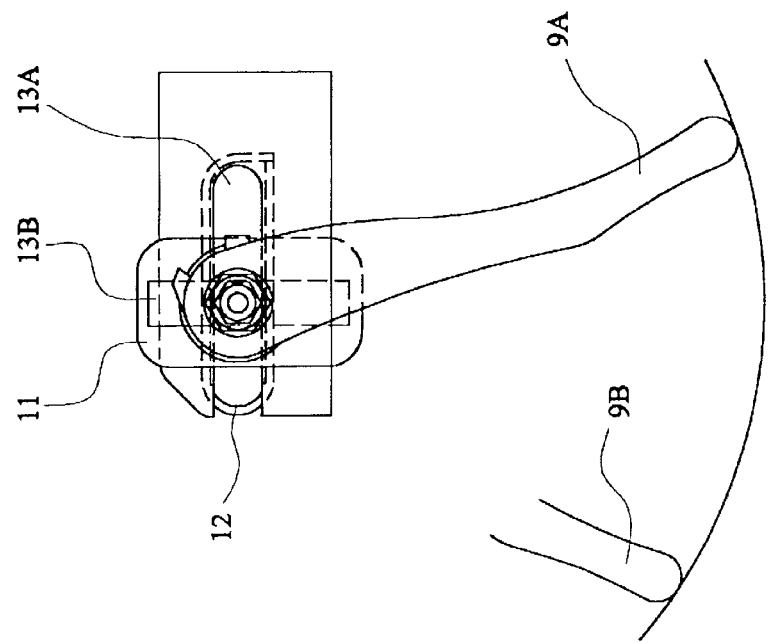
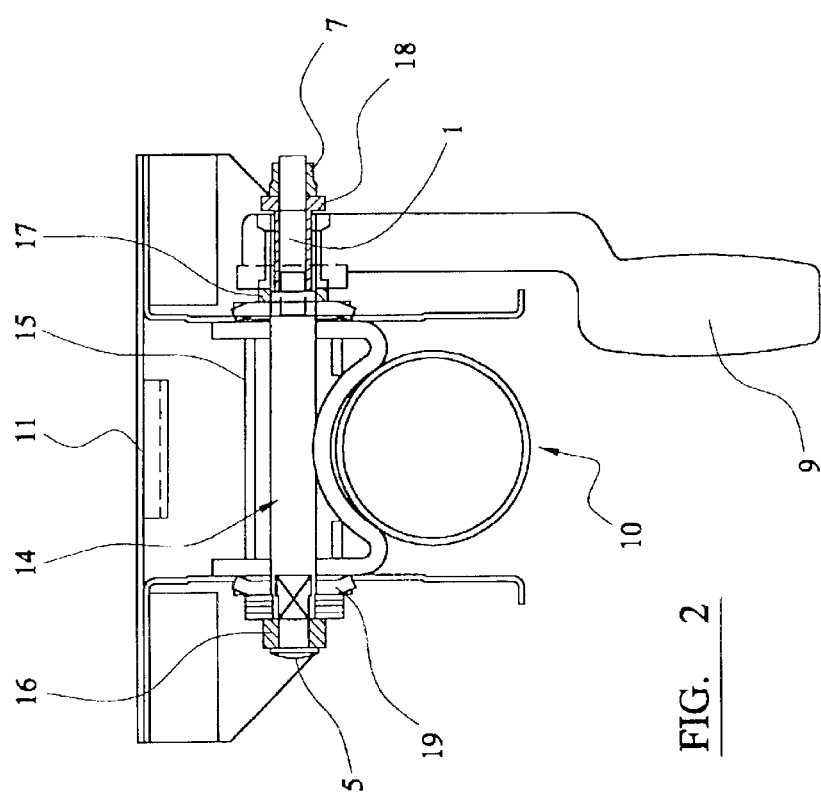
FIG. 2
FIG. 3

US 6,824,166 B2

STEERING COLUMN CLAMPING MECHANISM

BACKGROUND OF THE INVENTION

This invention relates to an adjustable steering column for a vehicle having a clamping mechanism with a clamp bolt assembly.

The steering columns are rake and/or reach adjustable to suit the comfort of the driver. A clamping mechanism is employed to release the steering column to facilitate such rake and/or reach adjustment of the steering wheel and is then clamped, usually by a clamping lever, to hold the steering column in its adjusted position.

BRIEF DESCRIPTION OF THE PRIOR ART

Typical clamp systems comprise components assembled laterally to the longitudinal installation/adjustment axis of the steering column, which are designed to convert driver-initiated rotational clamp/unclamp lever motion into tensile load in a clamp bolt in conjunction with a lever cam and cam follower or screw lift system. This tensile load is subsequently reacted as compressive clamp pressure between an adjacent slidable clamp bracket and static column bracket surfaces so as to produce a static friction break away force reaction to controlled limits.

A common problem associated with the operation of such clamp systems arises from loss in the actual performance of the actual clamping push load applied to the clamping components within the expected operational life of the vehicle due to load-generated creep in load bearing thermoplastic components, for example, surface-to-surface component wear and variable compressive stiffness in the structural supports, each of which has the effect of reducing the axial strain and thus tensile load generated in the clamp bolt and consequent loss of control of the static friction break away force.

SUMMARY OF THE INVENTION

According to the present invention, there is provided an adjustable steering column clamping mechanism having a clamp bolt assembly, the assembly including a substantially cylindrical rod with two ends, one end having a reduced diameter portion to receive a plurality of disc springs, a shoulder thereby being formed between the reduced diameter portion and the adjoining portion of the rod and there being means to place a primary load on the disc springs to put them into compression on the rod; the arrangement being such that, when the rod is placed under tension between its ends, the disc springs provide a substantially constant secondary load function to compensate for any loss of tensile load in the rod.

The end of the rod remote from the disc springs may be threaded.

The means to place a primary load on the disc springs may be a nut. The nut may be held in place by preening said one end of the rod over the nut. The nut may be a nut blank.

There may be a minimum of two disc springs and may be in a series or a parallel stack in multiples of two disc springs.

Said one end of the rod may be provided with a further reduced-diameter portion that extends from the extremity of the rod to the first mentioned reduced diameter portion. This further reduced-diameter portion may be roughen ed, such as by diamond knelling.

The clamping mechanism may be of the type that applies a primary clamping load on the clamp bolt assembly by means of at least one cam. Alternatively, the clamping mechanism may apply a primary clamping load on the clamp bolt assembly by means of a screw lift device.

BRIEF DESCRIPTION OF THE DRAWINGS

For a better understanding of the invention and to show how the same may be carried into effect, reference will now be made, by way of example, to the accompanying drawings, in which:

FIG. 2 is a diagrammatic end view of a clamping mechanism of an adjustable steering column for a vehicle and incorporating the present clamp bolt assembly;

FIG. 3 is a diagrammatic end view of the mechanism shown in FIG. 2; and

DESCRIPTION OF THE PREFERRED EMBODIMENT

Figure 1:
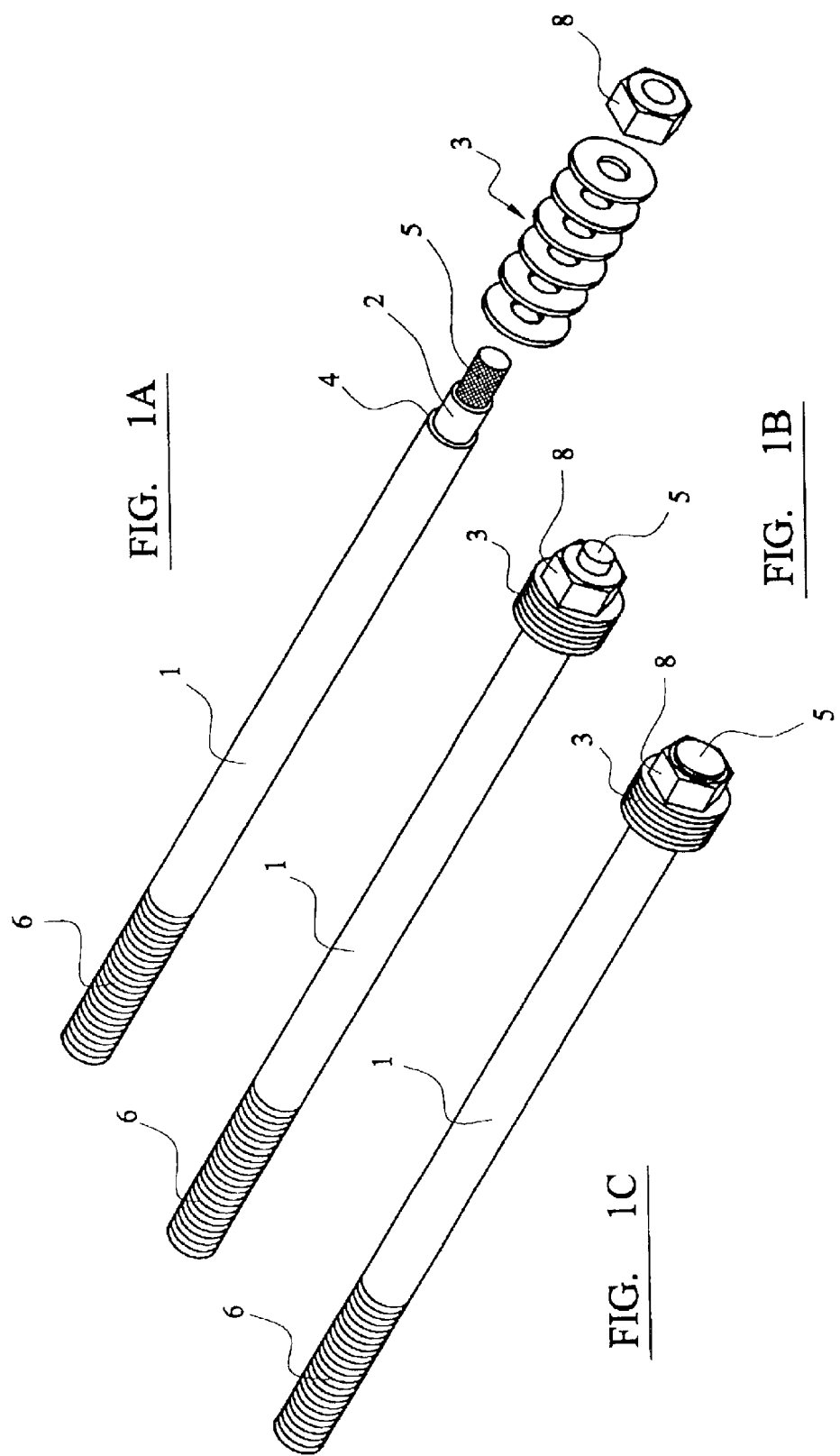
FIGS. 1A, 1B and 1C are perspective views of a clamp bolt assembly for a clamping mechanism for an adjustable steering column for a vehicle.

Referring to FIG. 1A to FIG. 1C, a clamp bolt assembly is shown that has a substantially cylindrical bolt or rod 1 at one end with a reduced diameter portion 2 to receive a plurality of disc springs 3. A shoulder 4 is thereby formed against which an innermost one of the disc springs 3 abuts once mounted on the rod 1. Between the extreme end of that end of the rod 1 and the shoulder 2 is provided a further reduced diameter portion 5 which is given a diamond knurled configuration. The rod 1 is of a bolt quality steel and is threaded at its other end 6 to receive a lock nut 7 (FIG. 2).

To secure the disc springs 3 on the bolt 1 and to load them in compression against the shoulder 4, a nut blank 8 is fitted over the endmost reduced diameter portion 5 (FIG. 1B), the latter then protruding from the nut blank 8 so that it can be preened over the outermost face of the nut blank 8 as shown in FIG. 1C.

Referring to FIGS. 2 and 3, an adjustable steering column clamping mechanism is illustrated that incorporates the present clamp bolt assembly and in the form illustrated, the clamp system employs a screw lift, as opposed to a cam lift, lever clamp/unclamp operation method. The clamping lever is shown at 9 and in FIG. 3 is shown at its unclamped position 9A and at its clamped position at 9B.

As is well known, a clamp bracket and tube assembly 10 is axially slidable within jaws of a steering column bracket 11 which is fixed to a vehicle cross car beam (not shown). Reach and rake adjustment is constrained by the clamp bracket which is wrapped over a center section 12 and slots 13A, 13B in the steering column bracket 11. A shaft assembly is shown at 14 and a clamping mechanism clamping bracket is shown at 15.

The rod 1 of the clamp bolt assembly passes through the shaft assembly 14 and a collar 10 surrounds the set of disc springs 3 at the preened end of the rod 1 whilst, in the region of the other end of the rod 1, a steel washer 17, differential screw 18 and the lock nut 7 are mounted. In order to assist in locating the clamp bolt assembly correctly, flats are provided in the region of the collar 10 to locate with a shaft lock 19 which locates in the vertical (rake) slot 13B.

The shaft assembly 10 includes a spigot on one side to accommodate installation of the lever assembly including the lever 9, the assembly being a thermoplastic lever assembly. A differential screw mechanism is provided to engage with the lever assembly to provide a null stop position.

Also provided is a means such as a washer to transfer compressive load generated by the clamping lever 9 to the clamp surfaces.

Thus, at the time of original assembly of the system, orientation of the clamp start position of the lever 9 is determined by positioning various parts at the required null start position and locking the lever assembly to the shaft assembly 10 by torque tightening the lock nut 7.

During the life of the vehicle and as a consequence of subsequent reach and rake operation of the upper steering column within the designed adjustment envelope, compressive creep can be generated and/or support surface-to-surface wear and/or a sinking support can develop. Any one of these changes can produce a small change in effective bolt or rod length which would normally cause a critical loss in tensile strain and hence primary load on the clamping system. However, with the present clamp bolt assembly, the primary load is also applied to and through the disc assembly and such change in bolt length is thus compensated for by non-critical relaxation displacement of the disc spring pack and this effectively produces a substantially constant force load system. Thus, structural deformation of the load bearing fabricated clamp bracket in any random position within its designed reach and/or rake adjustment envelope is compensated for by the substantially constant force provided by the present clamp bolt assembly.

Figure 4:
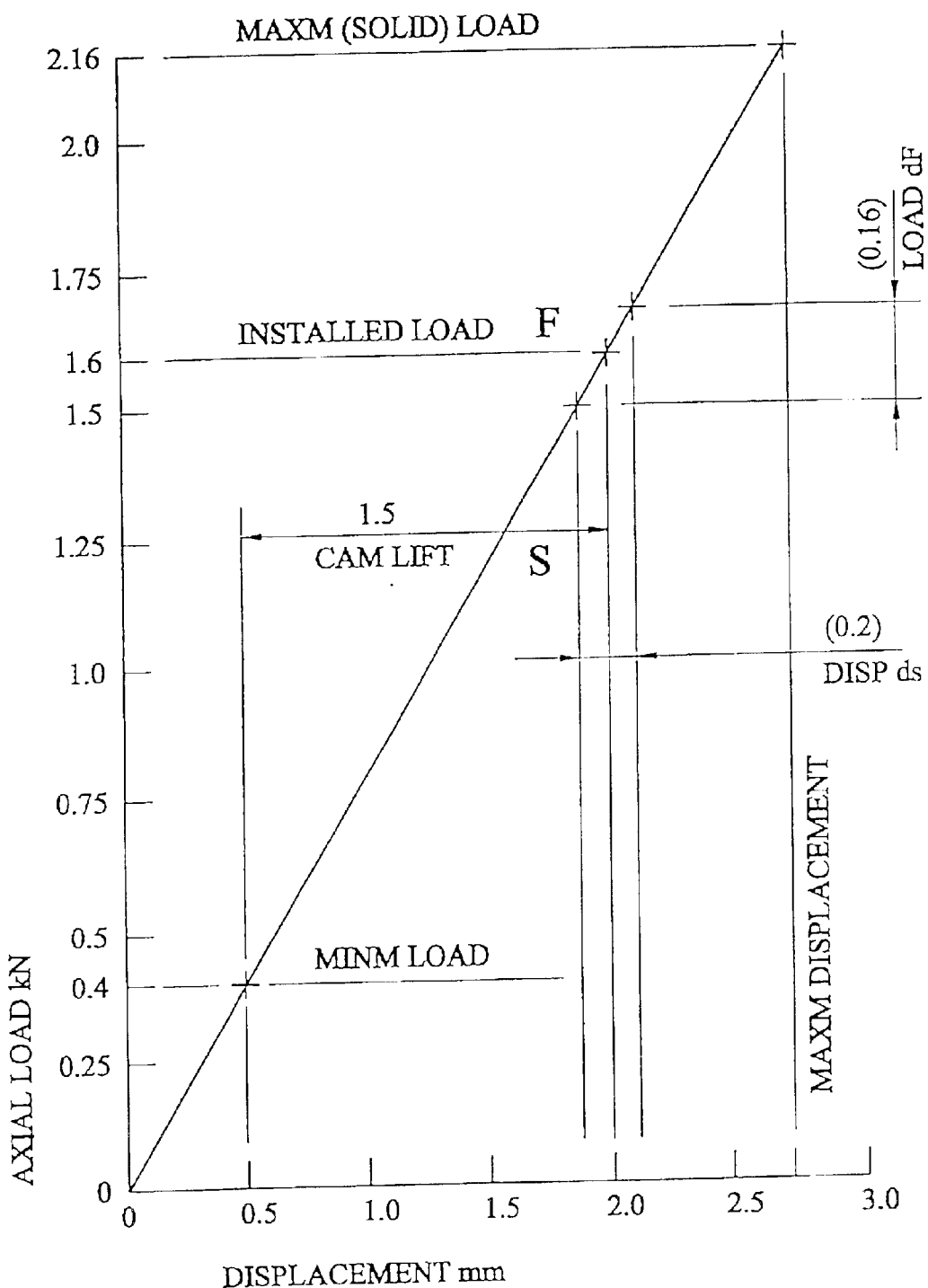
FIG. 4 is a graph illustrating performance of a typical example of the present clamp bolt assembly in use.

FIG. 4 is a graph that illustrates in a steering column installation the installed clamp bolt load dF that is generated by the lever operated cam/screw lift transferred into disc spring displacement ds. Tensile load is thus created in the bolt assembly according to the load v. displacement characteristic of the disc spring pack.

I claim:

1. An adjustable steering column clamping mechanism having a clamp bolt assembly, said clamp bolt assembly comprising:
   a substantially cylindrical rod, including:
      an intermediate portion having a first diameter,
      two ends, one end having a first reduced diameter portion relative to said diameter of said intermediate portion to receive a plurality of disc springs, and
      a shoulder, formed between said reduced diameter portion and said intermediate portion of said rod, to abut said plurality of disc springs;
   means to place a primary load on said plurality of disc springs to put said plurality of disc springs into compression against said shoulder; and
   wherein said plurality of disc springs provide a substantially constant secondary load to compensate for any loss of tensile load in said rod when placed under tension.

2. The adjustable steering column clamping mechanism according to claim 1, wherein the end of the rod remote from the disc springs is threaded.

3. The adjustable steering column clamping mechanism according to claim 1, wherein the means to place said primary load on the disc springs is a nut.

4. The adjustable steering column clamping mechanism according to claim 3, wherein the nut is held in place by preening said one end of the rod over the nut.

5. The adjustable steering column clamping mechanism according to claim 3, wherein the nut is a nut blank.

6. The adjustable steering column clamping mechanism according to claim 1, wherein said one end of the rod is provided with a second reduced-diameter portion relative to said first reduced diameter portion that extends from an extremity of the rod to the first reduced diameter portion.

7. The adjustable steering column clumping mechanism according to claim 6, wherein said second reduced diameter portion is roughened.

8. The adjustable steering column clamping mechanism according to claim 1 wherein said clamping mechanism is constructed to apply a primary clamping load on the clamp bolt assembly by at least one cam.

9. The adjustable steering column clamping mechanism according to claim 1 wherein said clamping mechanism is constructed to apply a primary clamping load on the clamp bolt assembly by a screw lift device.

10. A vehicle having an adjustable steering column assembly, the adjustable steering column assembly incorporating a clamping mechanism having a bolt assembly, the bolt assembly comprising:
    a substantially cylindrical rod, including:
       an intermediate portion having a first diameter,
       two ends, one end having a first reduced diameter portion relative to said diameter of said intermediate portion to receive a plurality of disc springs, and
       a shoulder, formed between said reduced diameter portion and said intermediate portion of said rod, to abut said plurality of disc springs;
    means to place a primary load on said plurality of disc springs to put said plurality of disc springs into compression against said shoulder;
    wherein said plurality of disc springs provide a substantially constant secondary load to compensate for or any loss of tensile load in said rod when placed under tension.

11. An adjustable steering column clamping mechanism having a clamp bolt assembly, the assembly comprising:
    a substantially cylindrical rod, including:
       an intermediate portion having a first diameter,
       two ends, one end having a first reduced diameter portion relative to the diameter of the intermediate portion to receive a plurality of disc springs, and
       a shoulder, formed between the reduced diameter portion and the intermediate portion of the rod, to abut said plurality of disc springs;
    a loading element to place a primary load on the plurality of disc springs to put the plurality of disc springs into compression against the shoulder;
    wherein, the plurality of disc springs provide a substantially constant secondary load to compensate for any loss of tensile load in the rod when placed under tension between the two ends.

12. The adjustable steering column clamping mechanism according to claim 11, wherein the end of the rod remote from the disc springs is threaded.

13. The adjustable steering column clamping mechanism according to claim 11, wherein the loading element to place said primary load on the disc springs is a nut.

14. The adjustable steering column clamping mechanism according to claim 13, wherein the nut is held in place by peening said one end of the rod over the nut.

15. The adjustable steering column clamping mechanism according to claim 13, wherein the nut is a nut blank.

16. The adjustable steering column clamping mechanism according to claim 11, wherein said one end of the rod is provided with a second reduced diameter portion relative to said first reduced diameter portion that extends from an extremity of the rod to the first reduced diameter portion.

17. The adjustable steering column clamping mechanism according to claim 16, wherein said second reduced diameter portion is roughened.

18. The adjustable steering column clamping mechanism according to claim 11, wherein said clamping mechanism is constructed to apply a primary clamping load on the clamp bolt assembly by at least one cam.

19. The adjustable steering column clamping mechanism according to claim 11, wherein in said clamping mechanism is constructed to apply a primary clamping load on the clamp bolt assembly by a screw lift device.

* * * * *